(12) United States Patent
Pugnetti

(10) Patent No.: US 11,753,131 B2
(45) Date of Patent: Sep. 12, 2023

(54) SHIP COMPRISING A SYSTEM FOR REDUCING THE VIBRATIONS ORIGINATING FROM THE CASING AND METHOD FOR BUILDING SAID SHIP

(71) Applicant: FINCANTIERI S.P.A., Trieste (IT)

(72) Inventor: Roberta Pugnetti, Trieste (IT)

(73) Assignee: FINCANTIERI S.P.A., Trieste (IT)

( * ) Notice: Subject to any disclaimer, the term of this patent is extended or adjusted under 35 U.S.C. 154(b) by 172 days.

(21) Appl. No.: 17/362,082

(22) Filed: Jun. 29, 2021

(65) Prior Publication Data

US 2022/0001969 A1 Jan. 6, 2022

(30) Foreign Application Priority Data

Jul. 3, 2020 (IT) .................. 102020000016102

(51) Int. Cl.
*B63H 21/34* (2006.01)
*B63H 21/30* (2006.01)
*B63B 3/02* (2006.01)

(52) U.S. Cl.
CPC ........... *B63H 21/34* (2013.01); *B63H 21/305* (2013.01); *B63B 3/02* (2013.01)

(58) Field of Classification Search
CPC ........ B63H 21/34; B63H 21/305; B63B 3/02; B63H 2035/00; B63H 17/0081; B63H 21/32; B63H 73/00; B63H 21/30; B63H 21/36; B63H 73/20; F01N 1/00; F01N 13/004; F01N 3/04; F01N 3/2066; F01N 13/08; F01N 2503/22; F01N 13/0097; F01N 13/1811; F01N 15/04

USPC ........................................................ 114/65 R
See application file for complete search history.

(56) References Cited

U.S. PATENT DOCUMENTS

| 4,678,439 A | 7/1987 | Schlichthorst |
| 6,142,090 A * | 11/2000 | Jakuba .................. H02M 7/003 |
| | | 114/65 R |
| 7,237,499 B2 * | 7/2007 | Armstrong ................ B63B 3/70 |
| | | 114/65 R |

FOREIGN PATENT DOCUMENTS

| DE | 846659 A | 8/1952 |
| JP | 60-121186 A | 6/1985 |
| JP | 2002234480 A | 8/2002 |

* cited by examiner

*Primary Examiner* — Daniel V Venne
(74) *Attorney, Agent, or Firm* — ArentFox Schiff LLP; Michael Fainberg

(57) ABSTRACT

The invention relates to a ship, comprising: at least one casing that delimits a cavity extending vertically across the ship's decks; at least one exhaust flue that is installed inside said casing and comprises a plurality of concentrated mass components and a plurality of components with mass distributed in length; a plurality of structures that support the plurality of said components inside the casing. Said support structures comprise: a plurality of main platforms, which define a main support base inside said cavity and is connected to walls of the casing at a ship deck by means of the interposition of main elastic suspensions; and a plurality of secondary platforms, which are directly or indirectly supported only by one of said main platforms and defines a secondary support base arranged at a different height with respect to the main support base that is defined by the corresponding main platform.

24 Claims, 14 Drawing Sheets

SHIP COMPRISING A SYSTEM FOR REDUCING THE VIBRATIONS ORIGINATING FROM THE CASING AND METHOD FOR BUILDING SAID SHIP

CROSS-REFERENCE TO RELATED APPLICATION

This application claims priority to Italian Patent Application No. 102020000016102 filed on Jul. 3, 2020, the entire contents of which is hereby incorporated in its entirety by reference

FIELD OF APPLICATION

The subject of this invention is a ship comprising a system for reducing the vibrations originating from the casing and a method for building said ship.

In particular, the ship that is the subject of this invention is a cruise ship.

BACKGROUND

The exhaust flues E for the combustion fumes generated by the engines M of a ship N are arranged inside one or more vertical cavities that extend from the engine room S to the funnels F, passing through all of the ship's decks P, as illustrated in FIG. 1. Each of these cavities, which usually have a rectangular cross section, is delimited around the edge thereof by a closed structure C, which is suitable to separate said cavity from the rest of the ship. This closed structure C, the technical name for which is "engine casing" or "casing," is structurally connected to the ship's decks P. The casing C is an integral part of the ship's structure and carries out important structural functions.

In cruise ships, the casings are integrated in the center of the ship. The casings are therefore surrounded by other spaces and are not separate structures or accessories, as in cargo ships. In cruise ships, the walls of the casings are therefore often adjacent to internal habitable areas of the ship.

In general, the above-mentioned vertical cavities are also used for the passage of other ducts, for example ventilation ducts V (in particular for ventilating the engine rooms), steam lines, vent ducts, compressed air ducts, etc.

All the components installed inside a vertical cavity, from the exhaust flues E to the ventilation ducts, are supported inside said cavity by means of horizontal support beams T that are fixed to the walls of the casing at each ship deck and form a series of grid-shaped platforms.

In recent years, due to a need to comply with ever more stringent environmental standards, the exhaust flues have been provided with fume treatment plants, which comprise very heavy and bulky components.

As illustrated in particular in FIGS. 2 and 3, in addition to the fume passage lines TE, at present an exhaust flue comprises the following components, listed sequentially starting from the engine room S: a system for controlling NOx emissions (SCR, Selective Catalytic Reduction), an exhaust gas boiler EGB for producing steam, a system SCB for controlling SOx emissions (or "scrubber") and one or more silencers.

System for Controlling NOx Emissions

The new IMO Tier III regulations further restrict emission limits in ECAs (Emission Control Areas). In this case, they aim to establish an 80% reduction in NOx emissions. The device most commonly used in the naval industry for reducing NOx is the secondary SCR (Selective Catalytic Reduction) system, which is positioned upstream of the exhaust gas boiler as the first element in the exhaust flue. In addition to being based on chemical processes, the SCR uses the passage of the gas through an extruded honeycomb catalyst. This catalyst constitutes a barrier to the free passage of the fumes, thus becoming a zone where energy is transferred from the fumes to the surrounding structures in the form of vibrations and sound.

Exhaust Gas Boiler

Some of the heat from the combustion gases is recovered in a tube bundle inside the exhaust gas boiler in order to produce steam. The tube bundle constitutes a real barrier to the flow of the gases that is necessary for exchanging heat but generates vibrations and noise. Consequently, energy is transferred to the support structure by means of the bases of the exhaust gas boiler in the form of significant structural noise. It is therefore necessary to limit this transfer using suitable elastic supports.

The SCR and the exhaust gas boiler are the heaviest elements inside a casing. As an approximation, taking into consideration the sizes used, the weight range for a single SCR/exhaust gas boiler may be the following: from 3.2 t for a ship having a GRT of 10,900 to 24 t for a ship having a GRT of 134,000.

Silencers

In order to be able to carry out their function, the silencers also have to operate according to the principle of a pressure drop that occurs by exchanging with surfaces made of absorbent materials (resistive silencers), or according to the principle of reflecting the soundwaves that are trapped in specially designed cavities (reactive silencers). The pressure drops are similar in order of magnitude to those in exhaust gas boilers and these may therefore also constitute a preferred transmission point for the structural noise. The weight of each individual silencer is in the range of between 1 t to 10 t, depending on the size.

System for Controlling SOx Emissions

Alongside the requirements for reducing NOx emitted into the air, new limits on the desulfurization of the SOx exhaust gases are being continuously updated. In order to comply with the new rules, shipowners are relying more and more on treatment systems composed of fume scrubbing towers, known as "scrubbers." The scrubbers are also zones where vibrations are transmitted to the casing, although to a much smaller degree than in exhaust gas boilers and SCRs, since they cause fewer pressure drops in the fumes, thus in fact being similar to a section of pipeline. However, the scrubbers have a significant influence on the stability of the ship since they are positioned in the highest part of the casing and are significantly heavier than a simple pipeline. An average scrubber has a weight of approximately 20 t.

As already pointed out, several of the components arranged inside a casing transfer noise and vibrations to said casing and therefore to the structures surrounding it. Every structure inside the casing continuing with the decks is therefore a potential carrier for transmitting the noise that is radiated in the areas surrounding the casing.

In particular, the components of the exhaust flues transmit low-frequency vibrations generated by the internal combustion engines of the ship to the casing. These vibrations are essentially constituted by the vibrations at the fundamental rotation frequency of the engines and of the vibrations at the firing frequency of the engines.

In order to limit the transmission of noise and vibrations to the casing from the components arranged thereinside, elastic suspensions (constituted by rubber bodies or rubberized brackets, etc.) are currently arranged at the points where the components (scrubbers, exhaust gas boilers, SCRs, lines, etc.) are attached to the support platforms inside the casing. These solutions are adopted for both fume treatment plants and for passing lines.

In several cases, the use of elastic suspensions does, however, not make it possible to satisfactorily reduce the vibrations, at least in the vicinity of the casing. In particular, these elastic suspensions are not able to cut low-frequency vibrations. Therefore, at least in cruise ships, the spaces adjoining the casing, which are generally valuable areas on account of being arranged in the center of the ship, are separated from the casing by the interposition of buffer spaces used as closets and/or cupboards, for example.

The arrangement of said buffer spaces is not, however, an entirely satisfactory solution, since, as well as not always ensuring effective cutting of the vibrations, it takes away useful space in valuable zones of the ship. This problem is all the more true in ships of average/small tonnage.

In the naval industry, and in particular the cruise ship sector, there is therefore a need that is yet to be satisfied to further reduce the transmission of noise and vibrations to the ship structures adjoining the casing, without the interposition of buffer spaces.

SUMMARY OF THE INVENTION

Therefore, the object of this invention is to eliminate or at least reduce the drawbacks of the prior art cited above by providing a ship with a system for reducing the vibrations originating from the casing, which makes it possible to further reduce the transmission of noise and vibrations to the structures adjoining the casing, without the interposition of buffer spaces.

Another object of this invention is to provide a ship with a system for reducing the vibrations originating from the casing that is structurally simple to produce, with substantially similar production costs to those of traditional solutions.

BRIEF DESCRIPTION OF THE DRAWINGS

The technical features of the invention according to the abovementioned objects may be clearly found in the content of the claims mentioned below and the advantages thereof will become clearer in the following detailed description, which is given with reference to the attached drawings that depict one or more embodiments thereof, purely by way of non-limiting example, in which

The elements or parts of elements that the embodiments described in the following have in common will be indicated by the same reference numerals.

DETAILED DESCRIPTION

Figure 1:
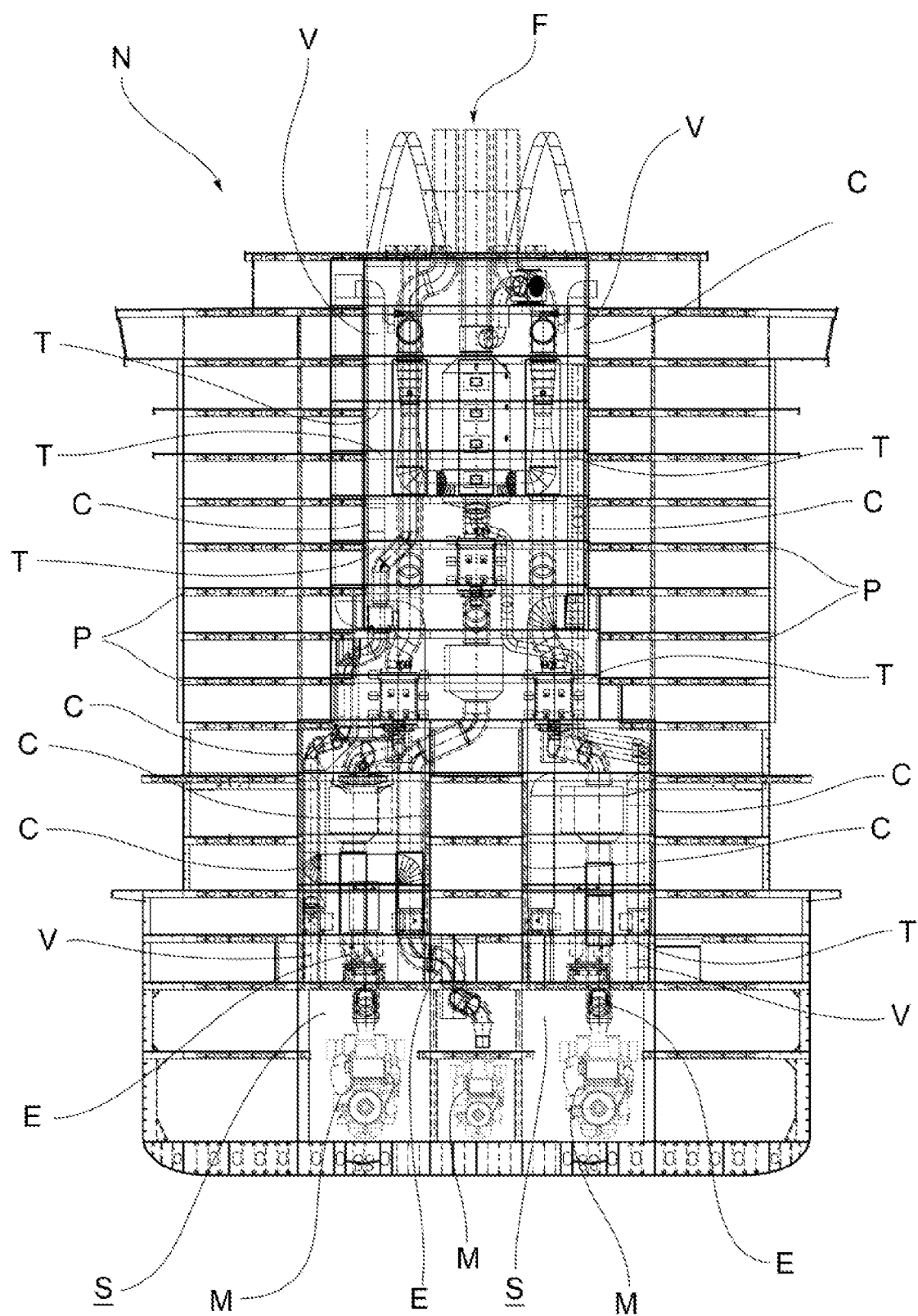
FIG. 1 is a sectional view of a cruise ship in correspondence of a casing, in order to highlight the exhaust flues installed therein.
Figure 2:
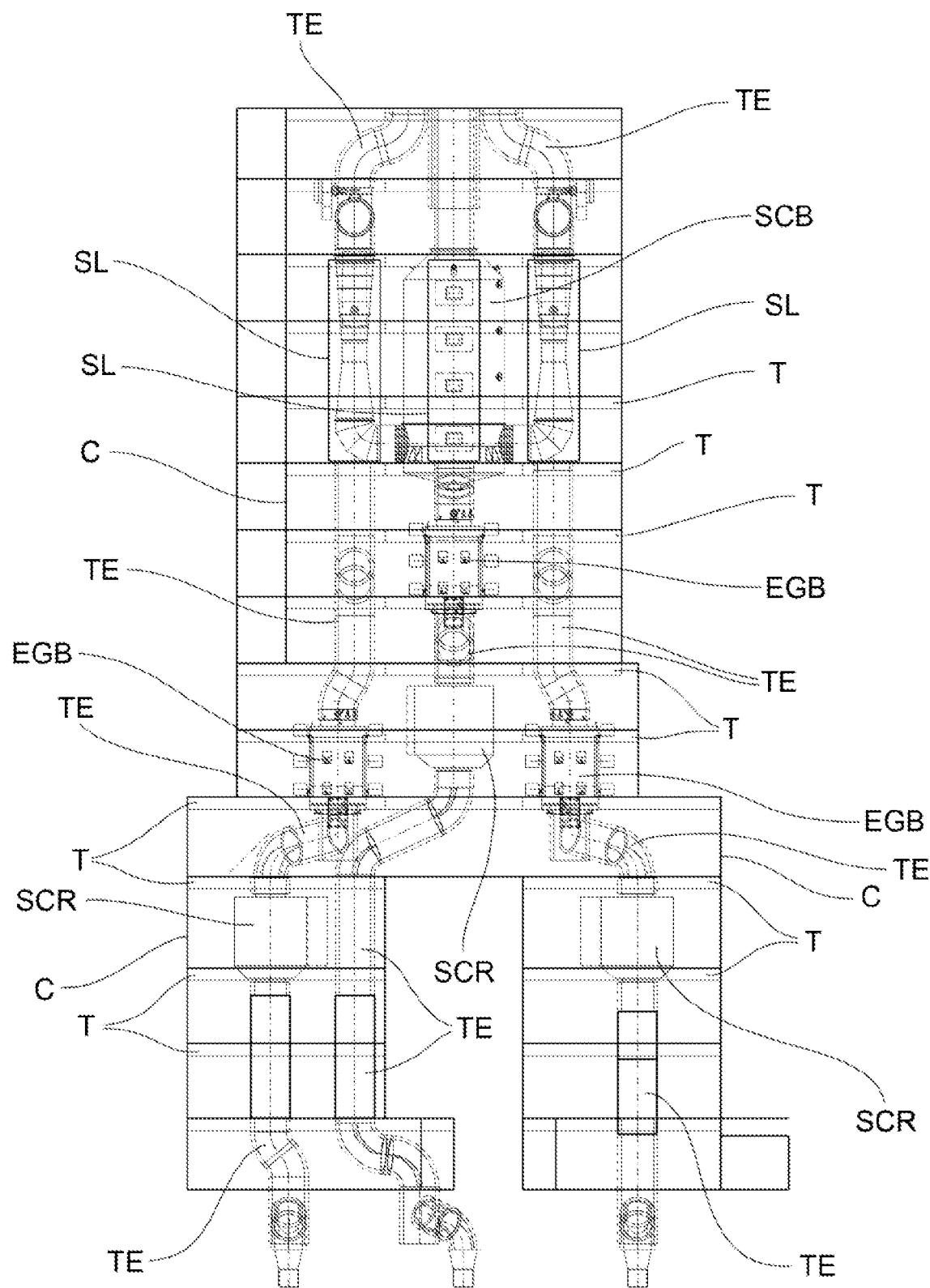
FIG. 2 is a detailed view of FIG. 1 relating only to the casing and to the exhaust flues.
Figure 3:
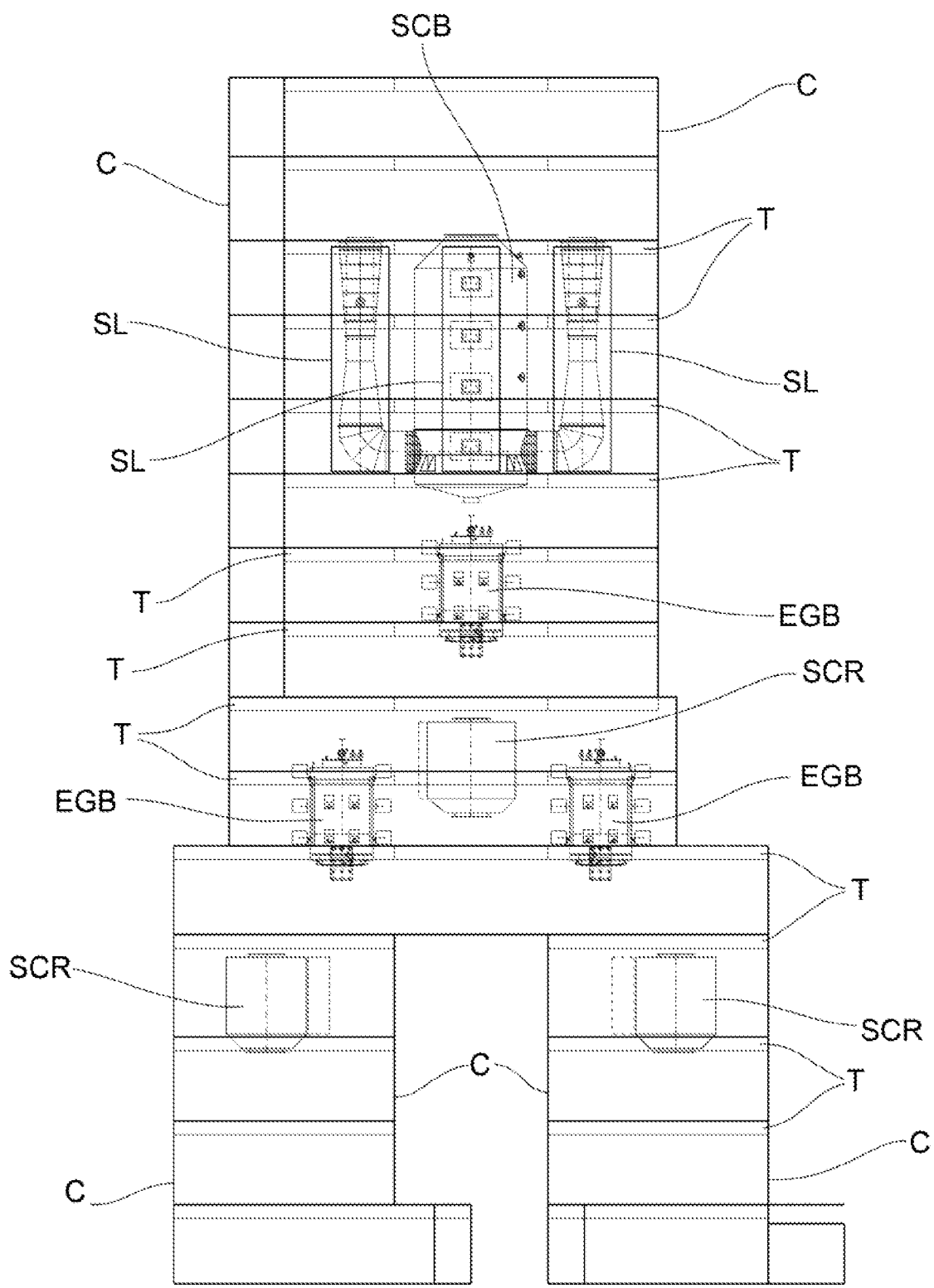
FIG. 3 shows FIG. 2, in which only the plants of the exhaust flues are depicted and not the relative lines.

The subject of this invention is a ship with a system for reducing the vibrations originating from the casing and a method for building said ship.

In particular, the ship that is the subject of this invention may be a cruise ship.

With reference to the attached drawings, reference numeral 1 indicates, as a whole, a ship according to the invention.

Figure 4:
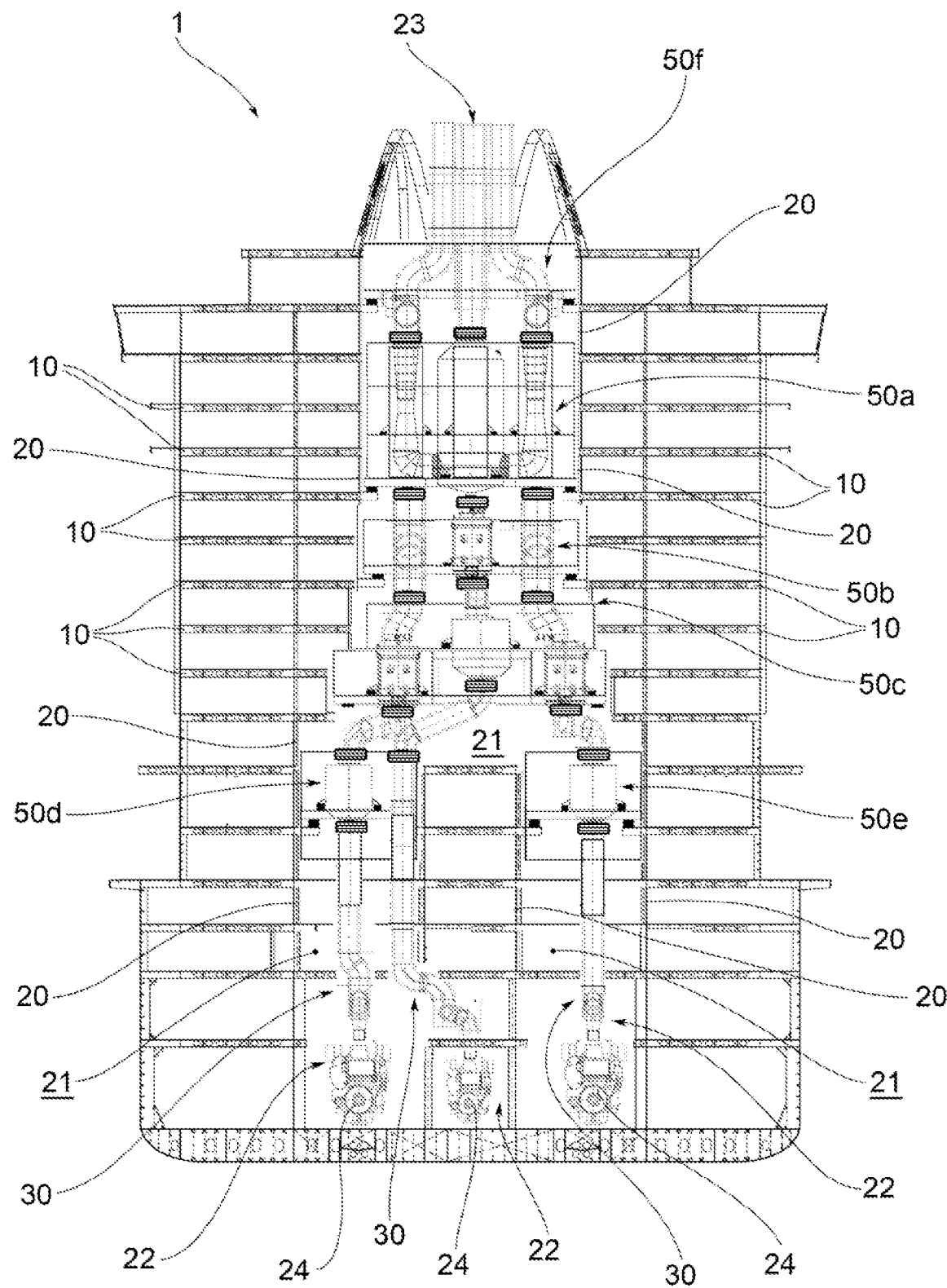
FIG. 4 is a sectional view of an example of a ship with a system for reducing the vibrations originating from the casing according to the invention, the section being made in correspondence of a casing.

In accordance with a general embodiment of the invention shown in FIG. 4, the ship 1 comprises:
a hull 2;
a plurality of decks 10 arranged inside the hull 2;
at least one engine casing 20 that delimits a cavity 21 extending vertically across the abovementioned plurality of decks 10 from an engine room 22 up to a funnel 23; and
at least one exhaust flue 30 for the fumes generated by one or more internal combustion engines 24 arranged in the abovementioned engine room 22.

In particular, the abovementioned internal combustion engines 24 may be diesel engines or diesel/gas engines.

The abovementioned exhaust flue 30 is installed inside the casing 20 and comprises a plurality of concentrated mass components 31, 32, 33, 34 and a plurality of components with mass distributed in length 35, 36.

"Concentrated mass components" means components of the exhaust flue 30 that have a considerable mass, also in relation to the system in question, which mass is supported by one or more contact points on which the relative weight rests, but in a restricted area.

In particular, components having a mass/volume ratio equal to or greater than 100 kg/m3 may be classified as concentrated mass components.

In particular, the plurality of concentrated mass components of said exhaust flue 30 comprises:
at least one SCR (Selective Catalytic Reduction) system 31, that is a catalytic system for controlling NOx emissions; and/or
at least one exhaust gas boiler 32 for producing steam; and/or
at least one fume scrubbing tower or scrubber 33, that is a system for controlling SOx emissions; and/or
at least one silencer 34.

Figure 5:
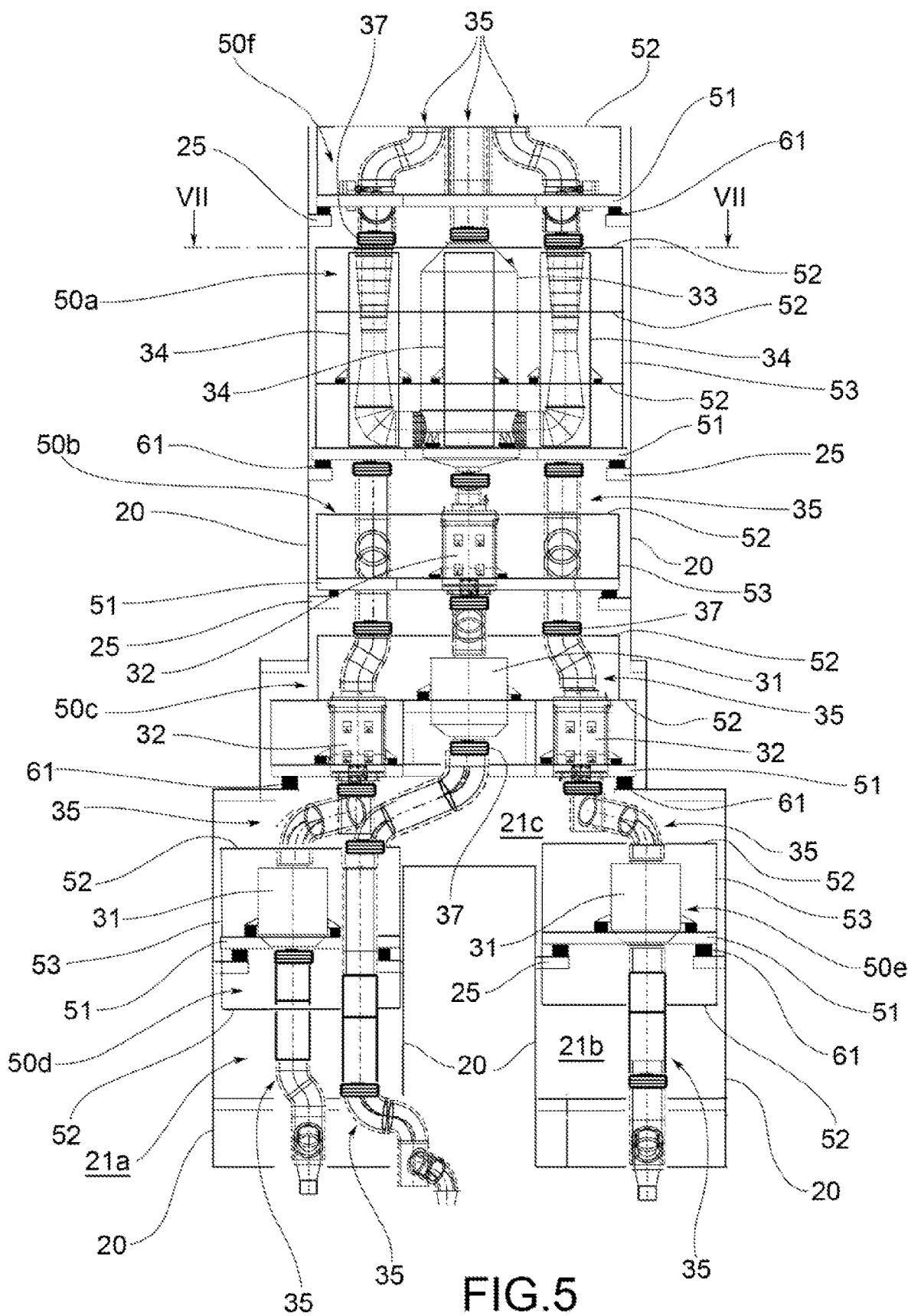
FIG. 5 is a detailed view of FIG. 4 relating only to the casing and to the exhaust flues installed therein.

As illustrated in FIG. 5, the abovementioned exhaust flue 30 preferably comprises: —one or more SCR (Selective Catalytic Reduction) systems 31; —one or more exhaust gas boilers 32 for producing steam; —one or more fume scrubbing towers or scrubbers 33; and —one or more silencers 34.

As an approximation, an SCR may have an average mass/volume ratio of around 220 kg/m3; an exhaust gas boiler may have an average mass/volume ratio of around 650 kg/m3; a fume scrubbing tower (scrubber) may have an average mass/volume ratio of around 130 kg/m3; a silencer may have an average mass/volume ratio of between 100 and 220 kg/m3.

"Components with mass distributed in length" means components of the exhaust flue 30 that have a modest mass, also in relation to the system in question, which has an extended lengthwise development.

In particular, sections of ducts or pipelines may be classified as components with mass distributed in length. More particularly, components of the line that have a mass/volume ratio of less than 50 kg/m3 may be classified as components with mass distributed in length.

In particular, components with mass distributed in length are the sections of pipeline 35 of the exhaust flue 30, which fluidically connect the various concentrated mass components of the exhaust flue one to the other, thus creating the necessary fluidic continuity from the engine exhausts up to the funnel.

Figure 6:
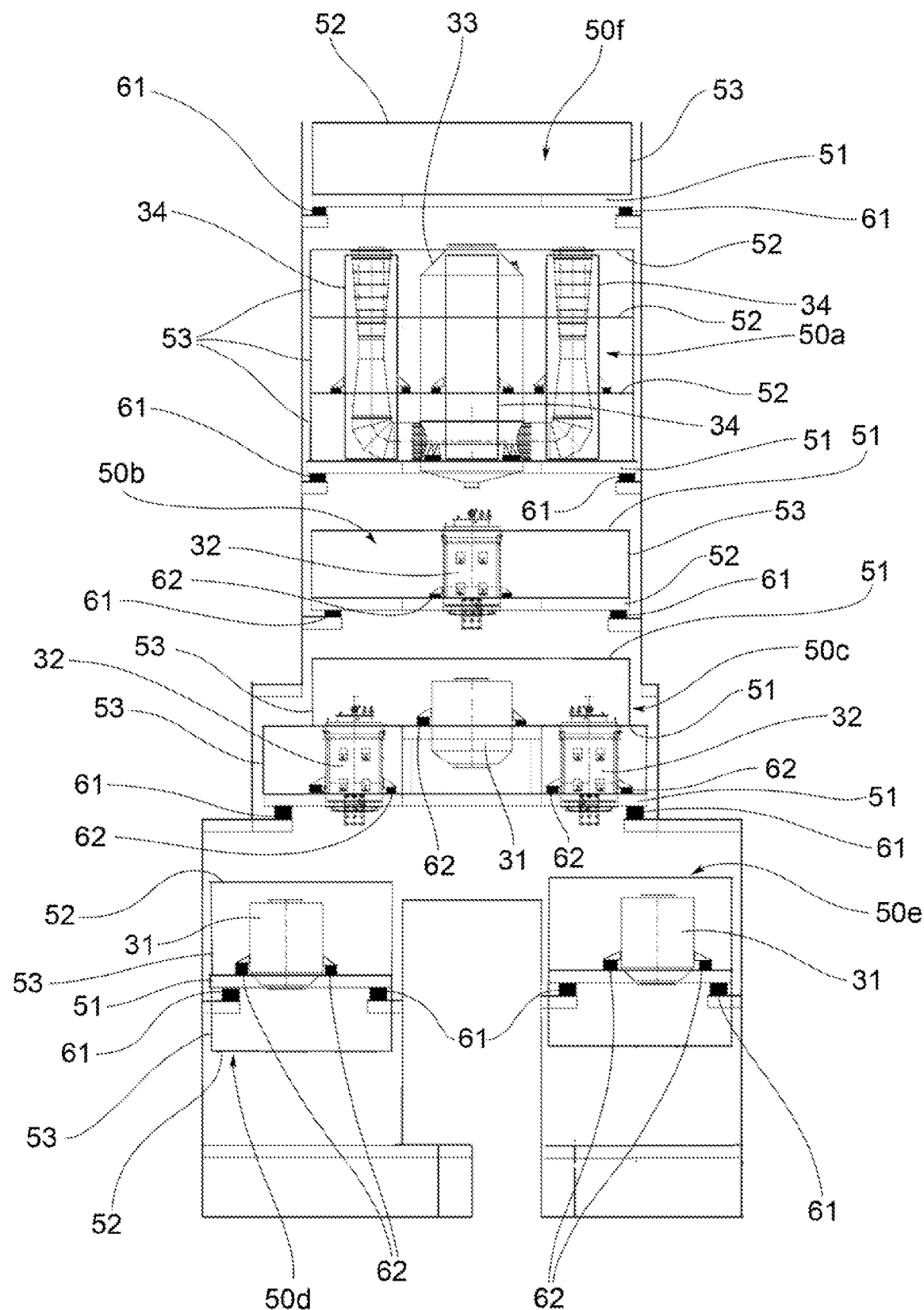
FIG. 6 shows FIG. 5, in which only the concentrated mass components of the exhaust flues are shown and not the distributed mass components.
Figure 7:
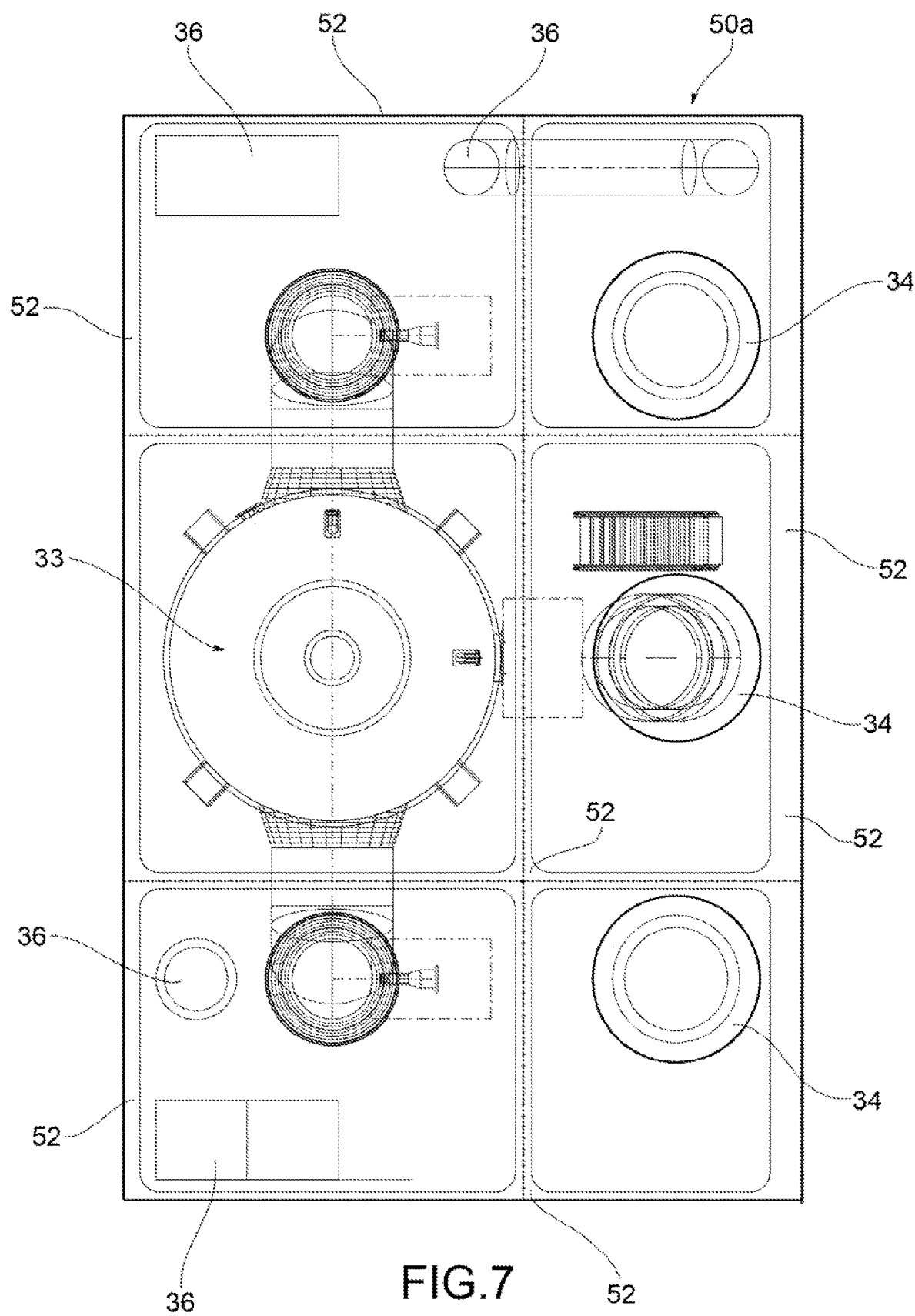
FIG. 7 is a plan view of the casing shown in FIG. 5 according to the section plane VII-VII indicated therein.
Figure 8:
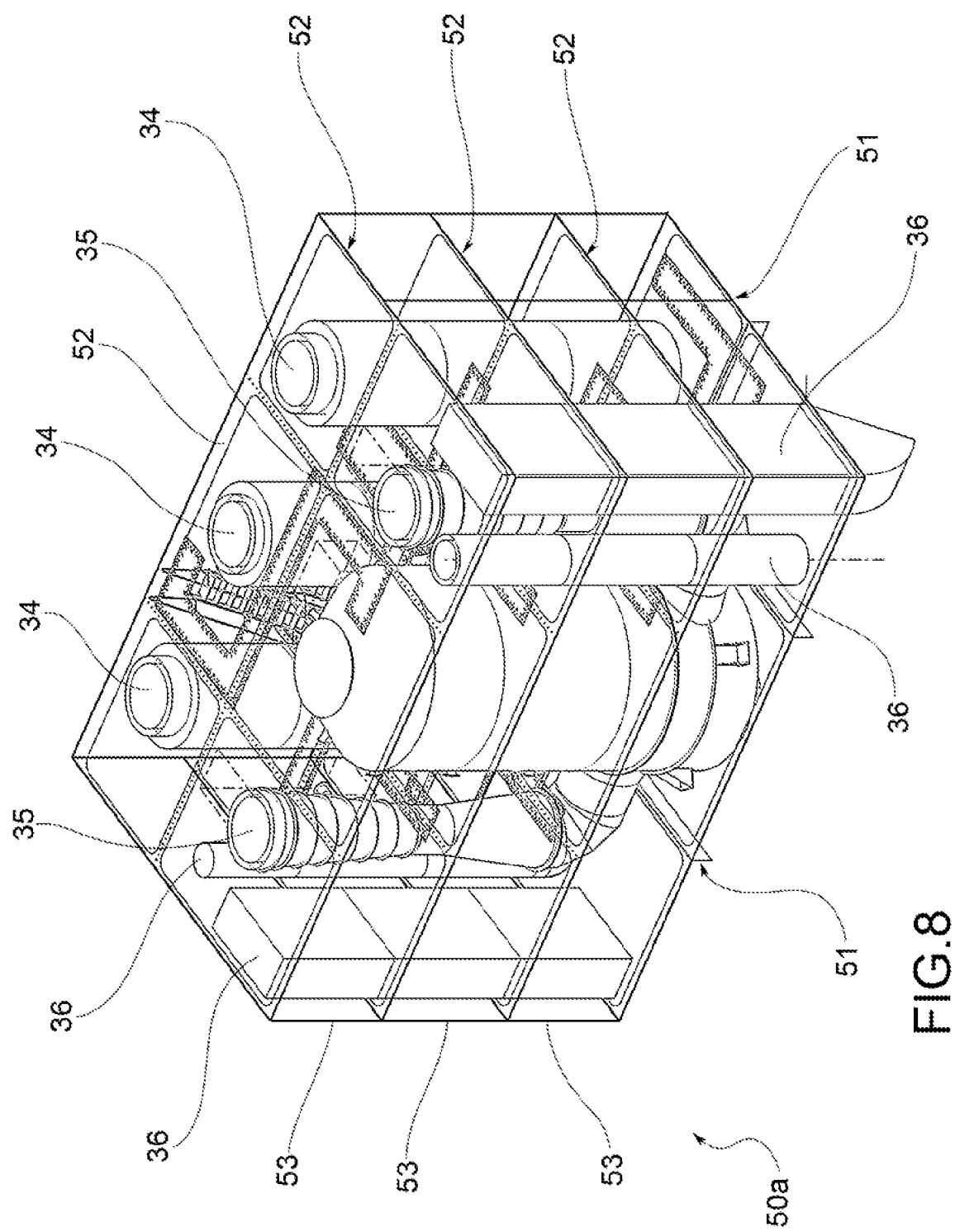
FIGS. 8, 9, 10 and 11 are perspective views of a first module, a second module, a third module and a fourth and fifth module, respectively, in which the exhaust flues inside the casing, shown in FIGS. 4, 5 and 6, have been divided up.
Figure 9:
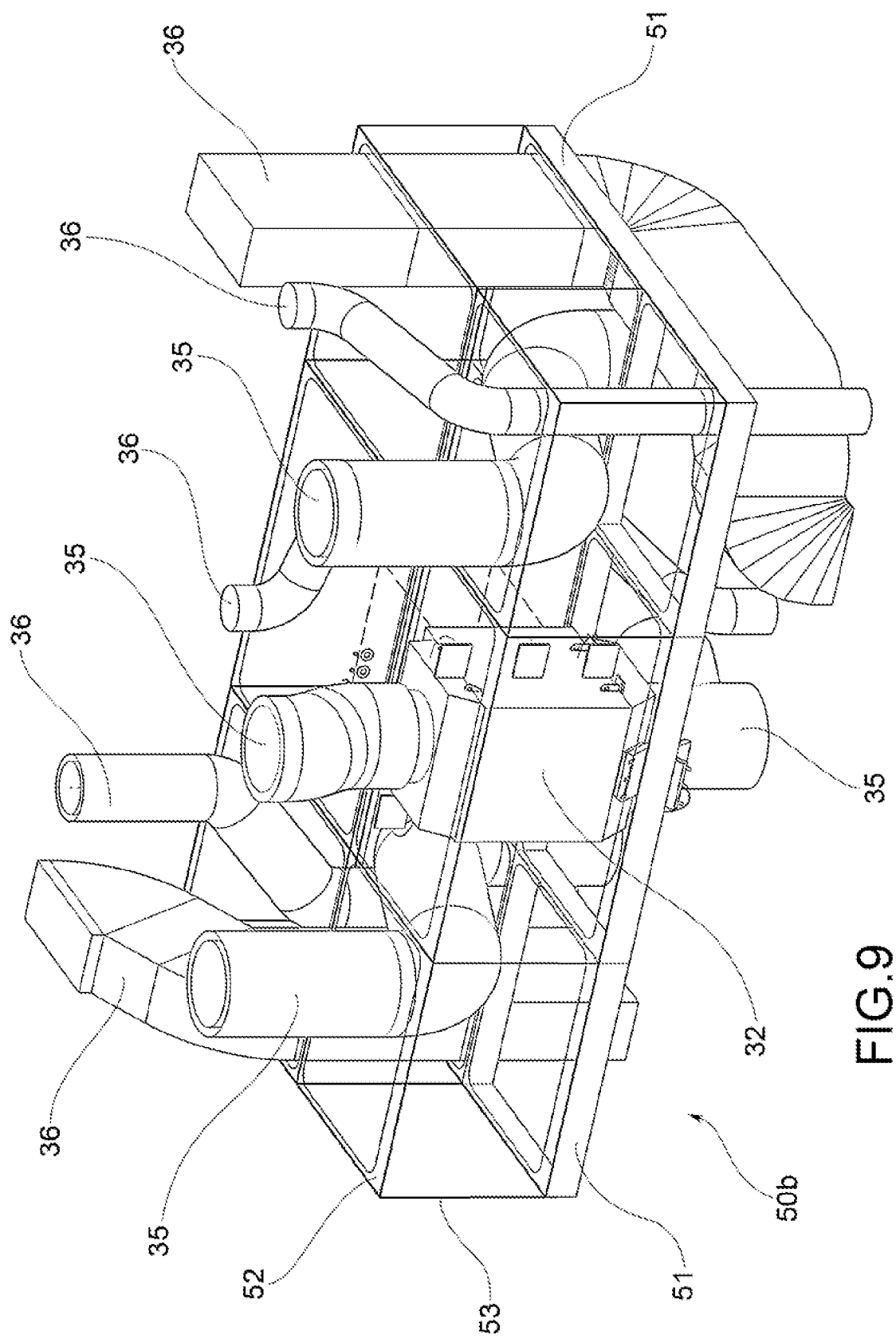
Figure 10:
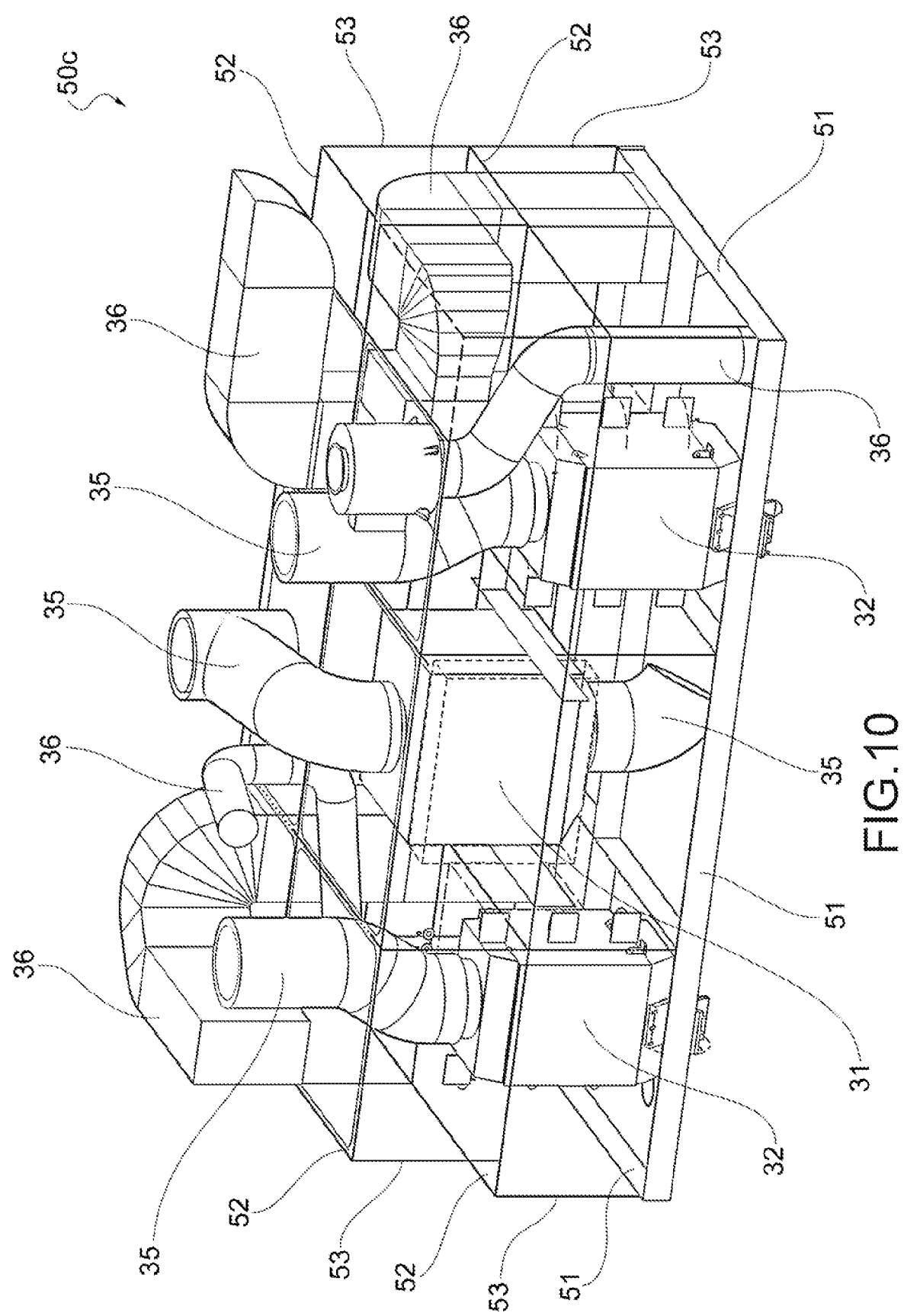
Figure 11:
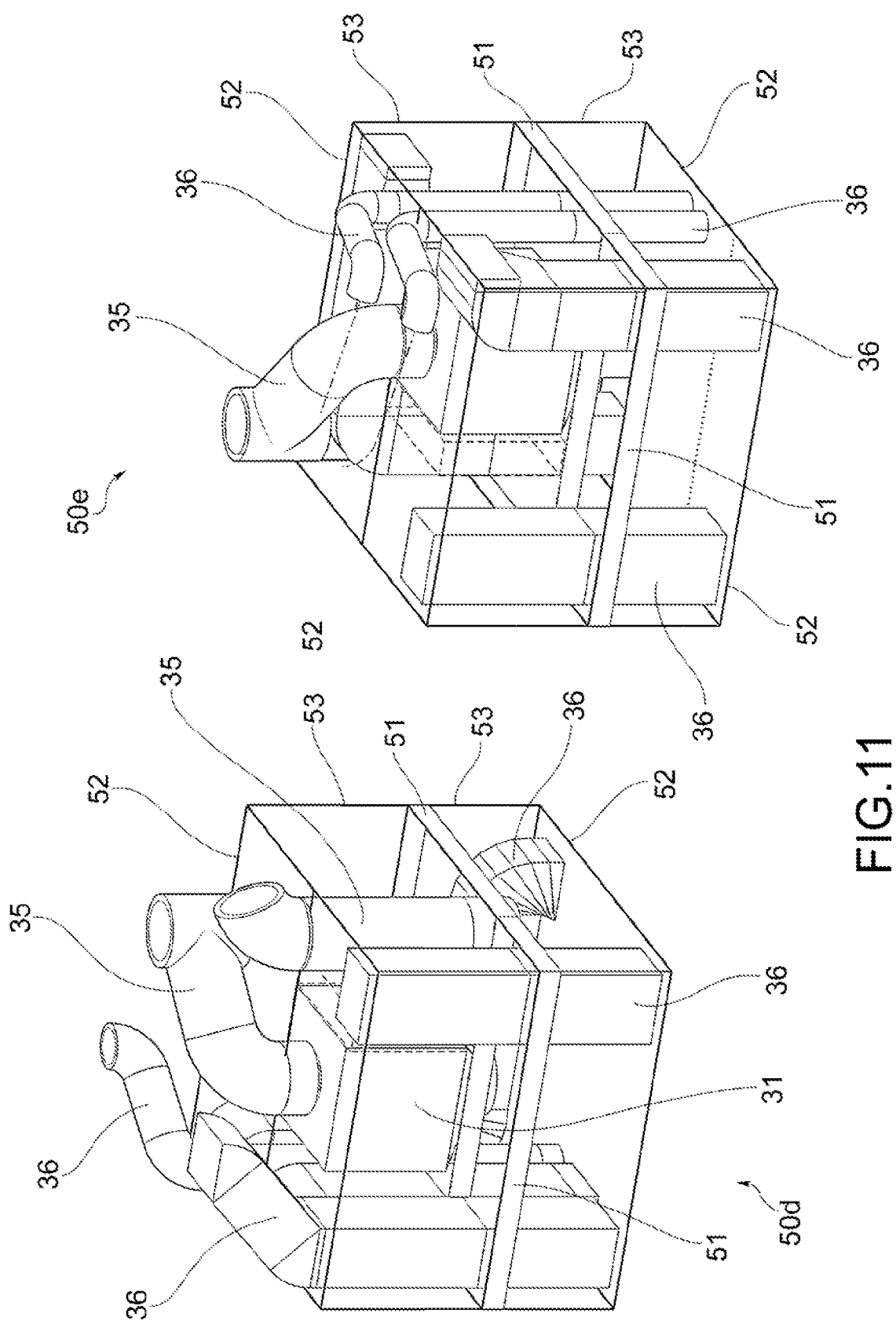

In particular, the cavity 21, which is delimited by the casing 20, may be a single cavity from the engine room 22 up to the funnel 23. More complex embodiments may be provided. For example, as illustrated in FIGS. 4, 5 and 6, the cavity 21 may be forked at the base into two starting sections 21*a* and 21*b* (in order to serve two separate engine rooms, for example), which connect upstream in a single upper section 21*c* extending up to the funnel 23.

The casing 20 may contain two or more different exhaust flues, which may remain separate up to the funnel or may reconnect in a common end section.

For ease of presentation, reference will be made in the following description to an exhaust flue, without, however, wanting to necessarily be limited thereby to the case of a single exhaust flue.

The ship 1 may advantageously comprise one or more lines for the passage of service fluids, such as ventilation lines, air vent lines, lines for the passage of steam and hydraulic lines.

Some sections of pipeline 36 of said one or more lines for the passage of service fluids may advantageously be installed inside the casing 20. These sections of pipeline 36 are considered to be additional components with mass distributed in length with respect to the distributed mass components 35 of the exhaust flue 20.

Figure 12:
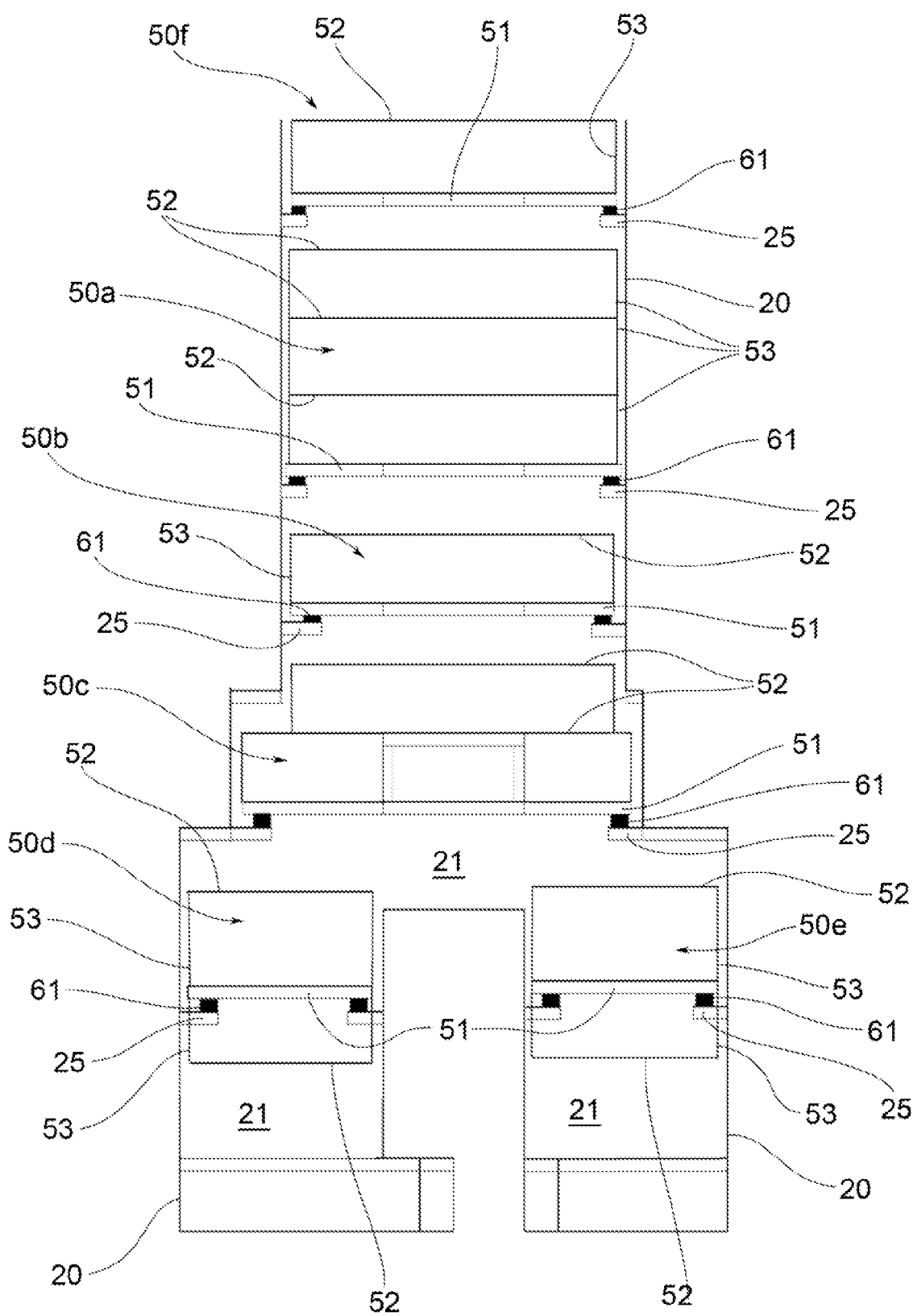
FIG. 12 shows FIG. 5, in which only the structures for supporting the concentrated mass components are shown.
Figure 13:
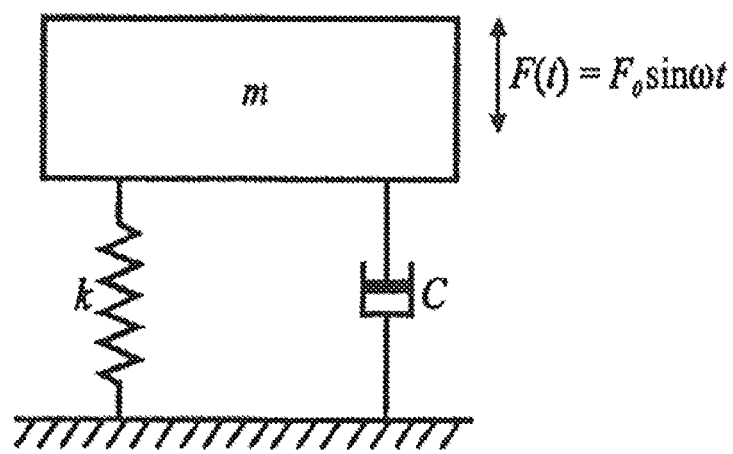
FIG. 13 shows the diagram of a vibration isolator having one degree of freedom.

As illustrated in particular in FIGS. 5, 6 and 12, the ship 1 further comprises a plurality of structures 51, 52, 53 that are suitable to support the plurality of said concentrated mass components 31, 32, 33, 34 and the plurality of said components with mass distributed in length 35, 36 inside the casing 20.

According to this invention, the abovementioned support structures comprise a plurality of main platforms 51, each of which defines a main support base inside the cavity 21 and is connected to walls of the casing 20 at a ship deck 10 by the interposition of main elastic suspensions 61.

Each main platform 51 is preferably constituted by a framework of beams that are structurally interconnected one to the other in order to form a grid-shaped structure, as illustrated in particular in FIGS. 8, 9, 10 and 11.

According to this invention, the abovementioned support structures further comprise a plurality of secondary platforms 52, each of which is directly or indirectly supported by just one of said main platforms 51 and defines a secondary support base arranged at a different height with respect to the main support base that is defined by the corresponding main platform 51.

As illustrated in particular in FIGS. 7, 8, 9, 10 and 11, each secondary platform 52 is preferably constituted by a framework of beams that are structurally interconnected one to the other in order to form a grid-shaped structure.

The main platforms 51 and the secondary platforms 52 may have a perimetric shape equivalent to the cross section of the casing, for example a rectangular shape. Embodiments may also be provided in which the platforms 51 and 52 have different shapes with respect to the cross section of the casing. The perimetric shape of the platforms is selected on the basis of the requirements relating to the position of the components of the exhaust flue and in such a way that the platforms do not geometrically interfere with the walls of the casing.

According to the invention, at least one of said concentrated mass components 31, 32, 33, 34 of the exhaust flue 30 is positioned on each main platform 51.

It is possible for two or more of said concentrated mass components to be positioned on a main platform 51.

The assembly constituted by:
- a main platform 51;
- a corresponding at least one concentrated mass component 31, 32, 33, 34;
- one or more possible secondary platforms 52 supported by said main platform; and
- one or more components with mass distributed in length 35, 36 connected to said main platform 51 and/or to said one or more possible secondary platforms 52, constitutes a structurally independent module 50*a*, 50*b*, 50*c*, 50*d*, 50*e*.

Advantageously, the exhaust flue 30 is therefore divided into two or more structurally independent modules 50, which are arranged in sequence along the vertical extension of the casing 20.

In accordance with the embodiment shown in the attached drawings, three separate exhaust flues 30 are installed in the casing 20. Starting from the engine room, each exhaust flue 30 sequentially comprises an SCR system 31, an exhaust gas boiler 32, a fume scrubbing tower or scrubber 33 and a silencer 34, which are joined together by sections of pipeline 35. In the example illustrated in the figures, the three exhaust flues 30 share the same fume scrubbing tower or scrubber 33. The abovementioned components of the three exhaust flues 30 are divided into five modules 50*a*, 50*b*, 50*c*, 50*d*, 50*e* that are structurally independent of one another. A first module 50*a* contains three silencers 34 and a scrubbing tower 33; a second module 50*b* contains an exhaust gas boiler 32; a third module 50*c* contains two exhaust gas boilers 32 and an SCR system 31; a fourth module 50*d* and a fifth module 50*e* (arranged on two separate sections of the casing) each contain an SCR system 31.

Preferably, in the top part of the casing 20, near to the funnels 23, each exhaust flue 30 comprises at least one fan (not shown in the attached drawings).

More specifically, the fans may be incorporated in the first module 50*a* and supported by one or more secondary top platforms that rest their weight on the main platform of said first module 50*a* by means of interconnecting structures. Alternatively, as illustrated in the attached drawings, the fans may be arranged in another structurally independent module 50*f* (end or top module) that is intended to close the casing at the top and is provided with its own main platform 51 (connected to the casing 20 by means of its own main elastic suspensions 61) and with one or more secondary platforms 52. In this case, the fans are treated as secondary concentrated mass components.

In particular, a module 50a, 50b, 50c, 50d, 50e may vertically extend to an extent that is equivalent to the spacing between two or more of the ship's decks. The modules 50a, 50b, 50c, 50d, 50e may have different vertical extensions. The vertical extension of one module is essentially determined by the dimensions of the concentrated mass component or components arranged inside said module, as well as by the lengthwise extension of the sections of pipeline arranged therein.

A module may contain the components of a single exhaust flue (as in the case of module 50e in the attached drawings) or may contain components of two or more different exhaust flues that pass through the same casing section 20 (as in the case of module 50a or 50d in the attached drawings, for example).

According to the invention, the abovementioned main elastic suspensions 61 of each main platform 51 are sized to cut the transmission—from the respective module 50a, 50b, 50c, 50d, 50e to the casing 20—of low-frequency vibrations generated by said engines and transmitted inside the casing 20 by said exhaust flue 30. The abovementioned main elastic suspensions 61 cut the abovementioned low-frequency vibrations by exploiting the high total mass of the respective module 50a, 50b, 50c, 50d, 50e.

Advantageously, cutting the vibrations reduces the annoying structural noise generated by them. "Structural noise" means the noise transferred via the ship's structure, which is generated by a source that makes said structure vibrate.

In particular, as illustrated in particular in FIG. 6, each module 50a, 50b, 50c, 50d, 50e is supported in correspondence of the respective main platform 51 on a plurality of projections 25 that project inside the casing and are structurally integrated with a ship deck and/or in the casing 20. The set of all of these projections 25 is sized to discharge the whole weight of the entire module 50a, 50b, 50c, 50d, 50e on the casing and/or on the ship's deck from which said projections extend. At each projection 25 one of said main elastic suspensions 61 is arranged, said main elastic suspensions 61 being therefore interposed between the module 50a, 50b, 50c, 50d, 50e and the individual projections 25.

In comparison with the solutions in the prior art, due to the invention two results, that synergistically cooperate in order to reduce/cut the transmission of low-frequency and ultra low-frequency vibrations from the exhaust flue to the casing, are obtained:
  the reduction in the points where the support structures connect to the casing: the exhaust flue is no longer connected at each of the ship's decks, but only at the ship's decks that are arranged at the height of the main platforms; and
  the high masses of the exhaust flue, and the masses of the support structures 51, 52, 53 distributed over several modules 50a, 50b, 50c, 50d, 50e, are aggregated together so as to define higher masses (having greater inertia) so as to be exploited to increase the cutting of low-frequency and ultra low-frequency vibrations; this in particular also makes it possible to use elastic suspensions having a high degree of efficiency and low frequency as main elastic suspensions.

In other words, designing the exhaust flue and the relative support structures as several structurally independent modules 50a-e makes it possible to exploit the high masses involved in order to reduce the natural frequency $f_0$ of the system intended as a single structurally independent module 50a, 50b, 50c, 50d, 50e, in order to ensure that the characteristic frequencies caused by the operation of the engine, the fundamental frequency and firing frequency, drop into the zone of greatest possible damping, thereby maximizing the effect of reducing the vibrations transmitted to the ship's structure.

Preferably, in consideration of the masses involved, in order to be able to suspend a plurality of such significant systems in terms of mass (that is the structurally independent modules 50a, 50b, 50c, 50d, 50e each comprising plants, lines, a main platform and secondary platforms), the high-efficiency and low-frequency main elastic suspensions to be used are those developed for large plants, as the main engines. These suspensions in fact have the required features and, unlike those used in the prior art for suspending the individual concentrated mass component, are optimized to ensure very low degrees of rigidities k, which result in very low natural frequencies of the elastic component (up to $4/5$ Hz), which, coupled with the mass of the module m, make it possible to keep the natural frequency f0 of the system very low and uncoupled from the exciting frequencies (main and firing frequencies), which will thereby be effectively cut.

In particular, the low-frequency vibrations that are generated by the engines and are transmitted inside the casing 20 by the exhaust flue 30 include:
  vibrations at the fundamental rotation frequency of the engines, that is the frequency relating to the rotation of the drive axle; and
  vibrations at the firing frequency of the engines, that is the frequency at which the engine cylinders fire.

Preferably, the fundamental rotation frequency of the engines is between 7 and 30 Hz, while the firing frequency of the engines is preferably between 40 and 150 Hz.

Preferably, the main elastic suspensions 61 of each module 50a, 50b, 50c, 50d, 50e have natural frequencies below 7 Hz.

More specifically, each module 50a-e may be regarded as a system having one degree of freedom, which will have a natural resonant frequency that is dependent on both the rigidity k of the main elastic suspensions 61 and on the mass m of the oscillator (suspended module), according to the equation:

$$f_0 = \frac{1}{2\pi} * \sqrt{\frac{k}{m}}$$

where m is the suspended mass and k represents the rigidity of the elastic suspensions.

In order to clarify the concept, it is useful to take into consideration the transmissibility T that represents the ratio between the force F transmitted to the foundation (ship's structure/casing 20) and the force F0, that is the exciting force.

The specific case considered by the invention mainly relates to the transmission from the engines by means of SCRs, exhaust gas boilers, silencers and scrubbers that, by interacting with the flow of the exhaust gases, obtain the energy therefrom and discharge it to the ship's structure via the suspension points.

According to the invention, the mass m is constituted by the entire module (concentrated and distributed mass components, main platform and secondary platforms).

It is also known that the transmissibility may be expressed as per the equation:

$$T = \frac{F}{F_0} = \sqrt{\frac{1+(2CX)^2}{(1-X^2)+(2CX)^2}}$$

where X=f/f0, in which f is the exciting frequency, while C is the damping factor.

The vibration amplitude of a system having one degree of freedom is therefore dependent on the mass m, the rigidity k and on the damping factor.

It may be seen from the T equation given above that:
when X tends towards 0, the transmissibility T tends towards 1; the ratio is therefore controlled by the rigidity k;
when X tends towards values >1, the transmissibility T tends towards zero; the ratio is controlled by the mass m.

Figure 14:
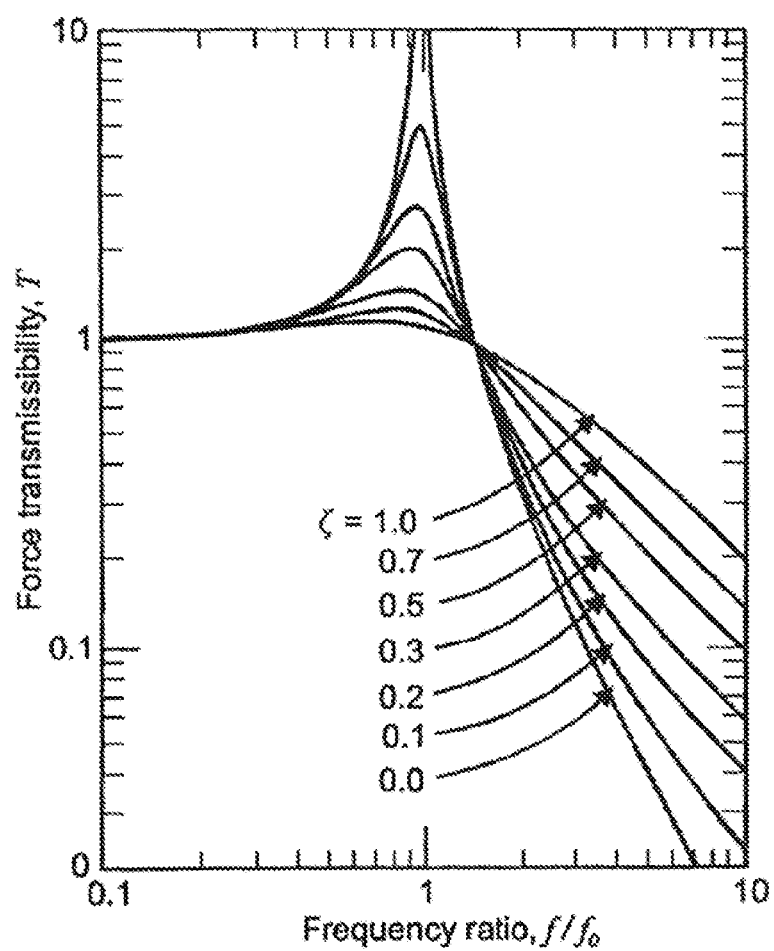
FIG. 14 shows the trend for the frequency ratio $f/f0$ with respect to the transmissibility T as a function of the value for the damping ratio $\zeta$.

FIG. 14 shows the trend for the frequency ratio f/f0 with respect to the transmissibility T as a function of the value for the damping ratio ζ that corresponds to the C/Cc ratio, where Cc is the critical damping coefficient. When ζ<0, the transient response of the system is cyclic, when ζ>=1, the response of the system is no longer cyclic. When ζ=0, the system is not damped. The case relating to ζ=0 derives from the equation of motion for an oscillator having one degree of freedom my"+Cy'+ky=F(t), from which the natural non-damped frequency f0 of a system having one degree of freedom is obtained for F(t)=C=0. Typical ζ values for rubber are 0.05-0.1, while for steel they are 0.005-0.01.

Referring now to FIG. 14, it can be seen that for values below the resonance (f/f0=1), not only is there no isolation but no amplification either; around the resonance (f/f0=1), there is amplification, while above 1.4×, the presence of an isolation element significantly increases the isolation. Therefore, when the frequency f0 of the system is at least 1.4 times lower than the exciting frequency, the presence of the resilient is effective.

For this reason, taking into consideration the above-cited frequencies involved, whose minimum values are around 7 Hz, it is preferable to have main elastic suspensions having a very low natural frequency (around 5 Hz, k low) in order to maximize the isolation effect. Furthermore, as expressed by the transmissibility equation T, in addition to the resonance, the response is controlled by the mass; and increasing the mass therefore makes it possible to reduce f0 and therefore to increase the f/f0 ratio for the benefit of isolating the system and consequently reducing the transmission of vibrations to the ship's structure.

Owing to this invention, it is therefore possible to significantly cut the transmission of low-frequency and ultra low-frequency vibrations from the exhaust flue to the casing and to the ship's structures that are adjacent to said casing, without interfering with the casing and the structures adjacent thereto.

In particular, it is no longer necessary to arrange buffer spaces around the casing. In this way, volumes become free around the casing that could not be used for valuable destinations in the solutions in the prior art due to the intensity of the vibrations originating from the casing.

Furthermore, the technical solution that is the subject of the invention may be produced with substantially similar costs to traditional solutions. In particular, interventions in the ship's structure are not required, but only a reconfiguration of the structures inside the casing. As will be highlighted in the following description, dividing the structures into structurally independent modules 50a-e makes it possible to apply prefabrication methods that cut assembly and installation costs.

As already highlighted previously, the ship 1 may comprise one or more lines for the passage of service fluids. Some sections of pipeline 36 of said one or more lines for the passage of service fluids may be installed inside the casing 20. These sections of pipeline 36 are considered to be additional components with mass distributed in length with respect to the distributed mass components of the exhaust flue 20. Some sections of pipeline 36 of said one or more lines for the passage of service fluids may be installed inside the casing 20.

Advantageously, some sections of pipeline 36 of said one or more lines for the passage of service fluids installed inside the casing 20 may be connected to the abovementioned support structures 51, 52, 53 as additional components with mass distributed in length. In this case, each structurally independent module 50a, 50b, 50c, 50d, 50e may comprise one or more sections of said pipelines 36.

Preferably, the sections of pipeline 36 belonging to the ventilation lines, air vent lines, lines for the passage of steam and hydraulic lines are connected to the support structures 51, 52, 53, while the pipelines of the fire-resistant lines are directly attached to the walls of the casing 20 for safety reasons.

Preferably, the sections of pipeline 35 for the passage of the exhaust gases and, if provided, the sections of pipeline 36 of one or more lines for the passage of service fluids, which sections are arranged in a first module, are fluidically connected to sections of pipeline of the respective lines that are arranged in a second module adjacent to the first module, by means of flexible connections 37. In this way, it is possible to ensure fluidic continuity in the various lines, without structurally fastening the different modules 50a-e to one another.

Preferably, as illustrated in the attached drawings, and in particular in FIG. 12, the abovementioned support structures comprise a plurality of structural interconnections 53 between the main platform 51 of a module and each secondary platform 52 of the same module 50a, 50b, 50c, 50d, 50e.

In particular, these structural interconnections 53, which are preferably vertical, may directly connect a secondary platform 52 to the main platform 51 (as shown in module 50b) or may indirectly connect a secondary platform 52 to the main platform 51 via at least one intermediate secondary platform (as shown in modules 50a and 50c, for example).

Advantageously, as illustrated in FIG. 8-11, the support structures 51, 52, 53 in each module 50a, 50b, 50c, 50d, 50e form a structurally integrated support frame, in particular in the shape of a cage, inside which the concentrated mass components and the components with mass distributed in length belonging to said module are arranged.

The secondary platforms 52 of one module may be arranged above and/or below the respective main platform 51.

Preferably, all of the secondary platforms 52 of a module may be arranged above the main platform 51, as provided in modules 50a, 50b and 50c. In this case, the structural interconnections 53 mainly operate under compression. However, embodiments may be provided in which one or more secondary platforms 52 may be arranged below the main platform 51, as provided in modules 50d and 50e. In this case, some structural interconnections 53 may also work under traction.

Preferably, each of the secondary platforms 52 of one module consists of a structure that is thinner and lighter than the structure that constitutes the respective main platform 51.

More specifically, the main platform 51 of a module is structurally sized so as to support the entire weight of the respective entire module 50a, 50b, 50c, 50d, 50e. The secondary platforms 52 instead carry out a secondary structural function, thus being substantially suitable to:
ensure support for the lines (lighter; components with mass distributed in length); and
ensure that there is access to the plants for maintenance purposes, with the possibility of traveling along the entire vertical extension of the casing.

For these reasons, the structures that form the secondary platforms 52 may be reduced to much thinner and lighter structures compared with the solutions in the prior art, which, on the contrary, provide platforms inside the casing at each ship deck, which have a structure similar to the ship's decks.

This preferred configuration offers a large margin of weight saving in relation to the supporting structures inside the casing. For example, in a ship having 20 decks, supposing the exhaust flue is divided across four modules, this indicatively means being able to lighten approximately 16 decks. In general, the impact of a reduction on the overall weight of the structures inside the casing may be estimated in the order of at least 40%.

Preferably, the sum of the masses of the respective main platform 51 and of the at least one concentrated mass component 31, 32, 33, 34 (or of the two or more concentrated mass components, if present) in a module 50a, 50b, 50c, 50d, 50e constitutes more than 50% of the mass of the entire module, even more preferably from 75% to 90% of the mass of the entire module.

Preferably, each module 50a, 50b, 50c, 50d, 50e is configured such that the barycenter thereof is located near to the respective main platform 51. In other words, each module is configured such that the barycenter is arranged as close to the plane passing through the main elastic suspensions 61 as possible. This further promotes the stability of said module 50a, 50b, 50c, 50d, 50e inside the casing. In this way, it is therefore possible to increase the vertical extension of a module, without having to use stabilizing elements that connect the module to the casing at different heights with respect to the main platform in order to damp any oscillations caused on said module by the movements of the ship.

Advantageously, as illustrated in the attached drawings, in the case of module 50c, the main platform 51 may extend over several planes in order to position several concentrated mass components at different heights inside said module. In other words, a main platform 51 may comprise portions that are not coplanar with one another.

Preferably, each module 50a, 50b, 50c, 50d and 50e is structurally independent from the other modules and is mechanically connected to the casing 20 only by means of the abovementioned main elastic suspensions 61.

Preferably, the main elastic suspensions 61 of each main platform 51 are distributed symmetrically to the barycenter of the respective module.

In accordance with a preferred embodiment, one or more of the abovementioned concentrated mass components 31, 32, 33, 34 and/or one or more of the abovementioned components with mass distributed in length 35, 36 may be connected to the support structures 51, 52, 53 by means of one or more secondary elastic suspensions 62. Preferably, as illustrated in particular in FIGS. 5 and 6, the concentrated mass components 31, 32 33, 34 are connected to the support structures 51, 52, 53 by means of one or more of said secondary elastic suspensions 62, while the components with mass distributed in length 35, 36 are directly connected to the support structures 51, 52 and 53.

Operatively, the action of the abovementioned secondary elastic suspensions 62 adds up to the action of the main elastic suspensions so as to further cut the transfer of vibrations and noise from the exhaust flue 30 to the casing and therefore to the ship's structures adjoining said casing. A dual suspension system is therefore formed, which may be regarded as being similar to a two-stage insulator, which is shown schematically in FIG. 15.

Preferably, the dual suspension is used either when the efficiency of the single suspension is not suitable or when it is necessary to attenuate not only a very low frequency, but also another frequency. This is exactly the case for diesel engines, for which both the main frequency and the firing frequency are taken into consideration.

Figure 15:
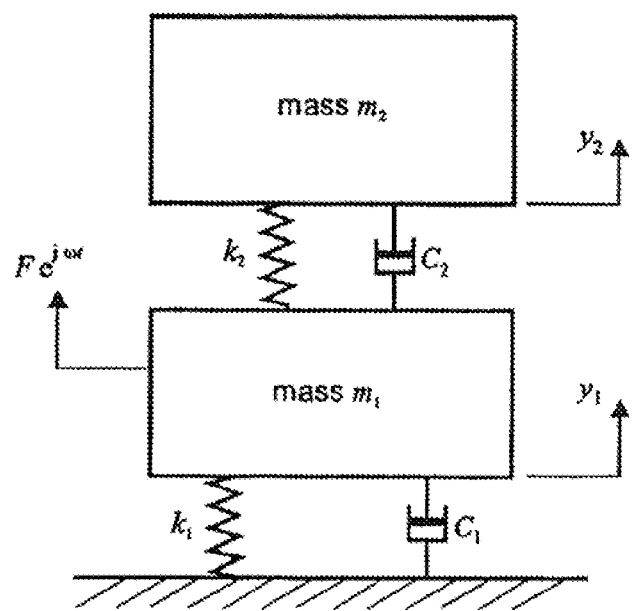
FIG. 15 shows the diagram of a two-stage vibration isolator.

More specifically, as shown schematically in FIG. 15, the dual suspension having two degrees of freedom in fact has two natural frequencies, two masses involved, m1 and m2, where m1 is the intermediate mass that in the invention consists of the sum of the mass of the main platform plus the masses of the secondary platforms and of all the pipelines (distributed masses) that are rigidly connected thereto. This mass m1 has to be as large as possible when compared with the masses m2 of the individual suspended concentrated mass components, and may, if necessary, also reach 70% thereof.

In this particular case, there will therefore be two frequencies in relation to the system, a lower fl and an upper fb that are the combination of the resonant frequencies f1 and f0, wherein:
f1=the resonant frequency of the mass m1, with the mass m2 considered to be fixed;
f0=the resonant frequency of the system having one degree of freedom of the mass m2, not taking into account the mass m1.

The combination of the two frequencies to describe the system makes it possible to calculate:
fl that will always be <f1 or f0;
fb that will always be >f1 or f0,
at double frequencies with respect to the higher frequency fb.

Figure 16:
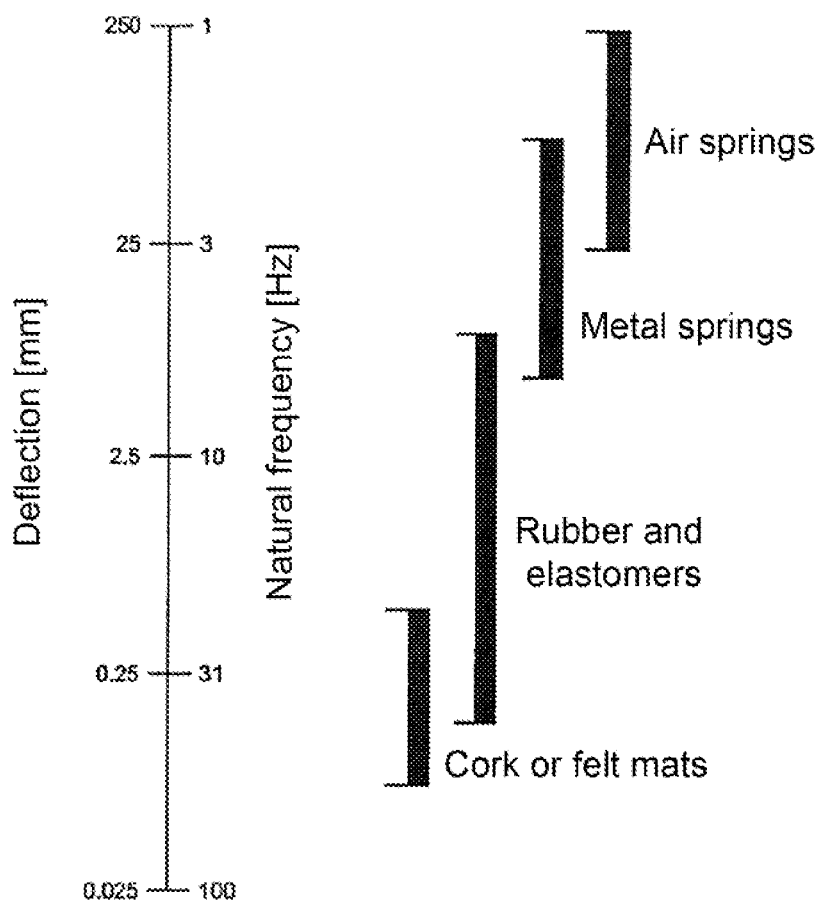
FIG. 16 is a schematic view of the operating ranges of certain types of passive suspensions on the basis of the type of decoupling device used.

Preferably, the abovementioned main elastic suspensions 61 and, if present, the abovementioned secondary elastic suspensions 62 are constituted by passive elastic suspensions. In particular, these passive elastic suspensions comprise decoupling components, preferably made of bodies made of elastomeric material, in particular rubber or silicone, metal springs, elastic components comprising a metal matrix and/or air springs. FIG. 16 schematically shows the operating ranges of some types of passive suspensions on the basis of the type of decoupling device used.

In accordance with particular embodiments, the main elastic suspensions 61 and, if present, the secondary elastic suspensions 62 may be constituted by:
semi-active elastic suspensions, that is constituted by a mass damper; or
active elastic suspensions.

In particular, "active elastic suspensions" means an active system for isolating the vibrations (AVC) that contains, together with the suspension, a feedback loop constituted by a sensor (for example a piezoelectric accelerometer or a geophone), a controller and an actuator. The signals, acquired by extremely sensitive vibration sensors, are analyzed by electronic circuits that drive electrodynamic actuators, which instantaneously produce a counterforce that compensates for the vibration. The active anti-vibration system has no resonance and no amplification of the vibrations at any frequency.

Advantageously, embodiments may be provided in which combinations of passive, semi-active and active elastic suspensions may be used in the same module.

In accordance with one rather preferred embodiment of the invention, each module 50a, 50b, 50c, 50d, 50e is a self-supporting structure, preferably prefabricated off-ship. Operatively, each module 50a, 50b, 50c, 50d, 50e is formed entirely off-ship in order to then be installed inside the casing from above.

The method for building said ship 1 according to the invention will now be described.

For descriptive simplicity, the entire description of the ship 1 will not be repeated again, but reference will be made to the description provided previously.

The method for building said ship 1 according to the invention comprises at least the following operating steps:
  a) building a hull 2 having a plurality of decks 10 arranged inside said hull and having at least one casing 20 that delimits a cavity 21 extending vertically across said plurality of decks 10 from at least one engine room 22 up to a funnel 23;
  b) installing inside said casing 20 at least one exhaust flue 30 for the fumes generated by one or more internal combustion engines 24 arranged in said at least one engine room 22, wherein said exhaust flue 30 comprises a plurality of concentrated mass components 31, 32, 33, 34 and a plurality of components with mass distributed in length 35; 36, which are supported inside said casing by means of a plurality of structures 51, 52, 53.

According to the invention, the abovementioned support structures 51, 52, 53 comprise:
  a plurality of main platforms 51, each of which defines a main support base inside said cavity 21 and is connected to walls of the casing 20 at a ship deck 10 by the interposition of main elastic suspensions 61; and
  a plurality of secondary platforms 52, each of which is directly or indirectly supported only by one of said main platforms 51 and defines a secondary support base arranged at a different height with respect to the main support base defined by the corresponding main platform 51.

In the above-mentioned installation step, step b), the support structures 51, 52, 53 and the components of the exhaust flue 31, 32, 33, 34 and 35; 36 are aggregated to form structurally independent modules 50a, 50b, 50c, 50d, 50e.

Each structurally independent module comprises a main platform 51, at least one concentrated mass component 31, 32, 33, 34 positioned on said main platform, one or more possible secondary platforms 52 supported by said main platform and one or more components with mass distributed in length 35; 36 connected to said main platform 51 and/or to said one or more possible secondary platforms 52.

The main elastic suspensions 61 of each main platform 51 are sized to cut the transmission—from the respective module 50a, 50b, 50c, 50d, 50e to the casing 20—of low-frequency vibrations that are generated by said engines and are transmitted inside the casing 20 by said exhaust flue 30, exploiting the total mass of said respective module 50a, 50b, 50c, 50d, 50e.

In accordance with one rather preferred embodiment of the invention, each module 50a, 50b, 50c, 50d, 50e is a self-supporting structure, preferably prefabricated off-ship. Operatively, each module 50a, 50b, 50c, 50d, 50e is made entirely off-ship in order to then be installed inside the casing from above.

The invention makes it possible to obtain numerous advantages that are presented throughout the description.

Owing to this invention, it is also possible to significantly cut the transmission of low-frequency and ultra low-frequency vibrations from the exhaust flue to the casing, and therefore to the structures of the ship that are adjacent to said casing, without interfering with the casing and the structures adjacent thereto.

In particular, it is no longer necessary to arrange buffer spaces around the casing. In this way, volumes are freed up around the casing that, in the solutions in the prior art, were withdrawn from being valuable destinations (for example communal areas, restaurants, etc.) due to the intensity of the vibrations originating from the casing and to the structural noise generated thereby.

In addition, the technical solution that is the subject of the invention may be implemented with substantially similar costs to traditional solutions. In particular, no interference in the ship's structure is necessary, but only a reconfiguration of the structures inside the casing.

Advantageously, owing to the invention, and in particular to the division of the support structures and of the exhaust flues inside the casing into modules, the design of the exhaust flues may enjoy greater degrees of freedom by being less bound to the ship decks.

In accordance with preferred embodiments, the configuration of the structures inside the casing as structurally dependent modules makes it possible to reduce the on-board weights and to reduce the barycenter height, benefitting the stability of the ship.

Dividing the structures inside the casing into structurally independent modules makes it possible to apply prefabrication methods that cut assembly and installation costs.

The invention conceived in this way therefore achieves the set objects.

Of course, when implemented in practice, said invention may also assume different embodiments and configuration to those illustrated above, without thereby departing from the present scope of protection.

Furthermore, all the details may be substituted by technically equivalent elements and any dimensions, shapes and materials may be used, depending on requirements.

The invention claimed is:

1. Ship, comprising:
  a hull;
  a plurality of decks arranged inside said hull;
  at least one casing delimiting a cavity extending vertically across said plurality of decks from at least one engine room to a funnel;
  at least one exhaust flue of fumes generated by one or more internal combustion engines placed in said at least one engine room, said at least one exhaust flue being installed inside said at least one casing and comprising a plurality of concentrated mass components with concentrated mass and a plurality of components with mass distributed in length;
  a plurality of structures suitable for supporting, inside the at least one casing, the plurality concentrated mass components and the plurality of components with mass distributed in length,
  wherein said support structures comprise:
  a plurality of main platforms, each of which defines a main support base inside said cavity and is connected to walls of the at least one casing at a ship deck by an interposition of main elastic suspensions; and a plurality of secondary platforms, each of which is supported directly or indirectly only by one of said plurality of main platforms and defines a secondary support base arranged at a different height with respect to the main support base defined by a corresponding main platform;

wherein at least one of said plurality of concentrated mass components is positioned on each main platform, and wherein an assembly consisting of a main platform, a corresponding at least one concentrated mass component, one or more secondary platforms supported by said main platform, and one or more components with mass distributed in length connected to said main platform and said one or more secondary platforms constitutes a structurally independent module, and wherein the main elastic suspensions of each main platform are sized to cut a transmission from the structurally independent module to the at least one casing of frequency vibrations generated by said one or more internal combustion engines and transmitted inside the at least one casing by said at least one exhaust flue, to utilize a total mass of said structurally independent module.

2. The ship according to claim 1, wherein said vibrations comprise vibrations at a fundamental rotation frequency of the one or more internal combustion_engines and vibrations at a firing frequency of the one or more internal combustion engines, wherein the fundamental rotation frequency of the one or more internal combustion engines is between 7 and 30 Hz, while the firing frequency of the one or more internal combustion engines is between 40 and 150 Hz.

3. The ship according to claim 1, wherein at least one module comprises two or more concentrated mass components and wherein said two or more concentrated mass components are positioned on the main platform of said at least one module.

4. The ship according to claim 1, wherein the main platform of a module may comprise non-coplanar portions.

5. The ship according to claim 1, wherein said plurality of concentrated mass components of said at least one exhaust flue comprise at least one selective catalytic reduction (SCR) device.

6. The ship according to claim 1, wherein said plurality of concentrated mass components of said at least one exhaust flue comprise at least one exhaust gas boiler.

7. The ship according to claim 1, wherein said plurality of concentrated mass components of said at least one exhaust flue comprise at least one scrubber.

8. The ship according to claim 1, wherein said plurality of concentrated mass components of said at least one exhaust flue comprise at least one silencer.

9. The ship according to claim 1, wherein said plurality of components with a mass distributed in length of said at least one exhaust flue comprise sections of pipeline for transit of exhaust gases.

10. The ship according to claim 1, comprising one or more lines for passage of service fluids, wherein sections of pipelines of said one or more lines for the passage of service fluids are installed inside said at least one casing and are connected to said support structures as additional components with a mass distributed in length, wherein each module comprises one or more sections of said pipelines.

11. The ship according to claim 10, wherein the sections of pipeline for the passage of exhaust gases and the sections of pipeline of one or more lines for the passage of service fluids arranged in a first module are fluidically connected to sections of pipeline of the respective lines arranged in a second module adjacent to the first module by flexible connections.

12. The ship according to claim 1, wherein the main elastic suspensions of each main platform are distributed symmetrically with respect to barycenter of the respective module.

13. The ship according to claim 1, wherein said support structures comprise a plurality of structural interconnections between the main platform of a module and each secondary platform of a same module, wherein said structural interconnections, vertical, connect said secondary platform directly to the main platform or indirectly to the main platform via at least one intermediate secondary platform.

14. The ship according to claim 1, wherein each of the one or more secondary platforms of a module are arranged above or below a respective main platform.

15. The ship according to claim 1, wherein each of the one or more secondary platforms of a module consists of a thinner and lighter structure than the structure constituting a respective main platform.

16. The ship according to claim 1, in which in a module a sum of masses of a respective main platform and of the at least one concentrated mass component constitutes more than 50% of a mass of an entire module.

17. The ship according to claim 1, wherein a barycenter of a module is located near a respective main platform.

18. The ship according to claim 1, wherein one or more of the said concentrated mass components or one or more of said plurality of mass components distributed in length are connected to said support structures by means of one or more secondary elastic suspension(s).

19. The ship according to claim 1, wherein said main elastic suspensions and secondary elastic suspensions consist of passive elastic suspensions, comprising decoupling components made of bodies in elastomeric material comprising rubber, silicone, metal springs, elastic components with a metal matrix, or air springs.

20. The ship according to claim 1, wherein said main elastic suspensions and secondary elastic suspensions consist of semi-active elastic suspensions.

21. The ship according to claim 1, wherein said main elastic suspensions and secondary elastic suspensions consist of active elastic suspensions.

22. The ship according to claim 1, wherein each module is structurally independent from other modules and is mechanically connected to the at least one casing only by means of said main elastic suspensions.

23. The ship according to claim 1, wherein each module is a self-supporting structure prefabricated off-ship.

24. Method for building a ship, comprising operating steps:

building a hull with a plurality of decks arranged inside said hull and with at least one casing delimiting a cavity extending vertically across said plurality of decks from at least one engine room to a funnel;

installing inside said at least one casing at least one exhaust flue of fumes generated by one or more internal combustion engines arranged in said at least one engine room, wherein said at least one exhaust flue comprises a plurality of concentrated mass components with concentrated mass and a plurality of components with mass distributed in length which are supported inside said at least one casing by means of a plurality of structures, wherein said support structures comprise:

a plurality of main platforms, each of which defines a main support base inside said cavity and is connected to walls of the at least one casing at a ship deck by an interposition of main elastic suspensions; and a plurality of secondary platforms, each of which is supported directly or indirectly only by one of said plurality of main platforms and defines a secondary support base arranged at a different height with respect to the main support base defined by a corresponding main platform and wherein in said installation step (b), the support structures and components of the at least one exhaust flue are aggregated to form structurally independent modules, wherein each structurally independent module comprises a main platform, at least one concentrated mass component, placed on said main platform, one or more secondary platforms supported by said main platform, and one or more components with a mass distributed in length connected to said main platform and to said one or more secondary platforms, wherein the main elastic suspensions of each main platform are sized to cut a transmission from the structurally independent module to the at least one casing of frequency vibrations generated by said one or more internal combustion engines and transmitted inside the casing by said at least one exhaust flue, to utilize a total mass of said structurally independent module.

\* \* \* \* \*